US011554577B2

(12) United States Patent
Naeyaert (10) Patent No.: US 11,554,577 B2
(45) Date of Patent: Jan. 17, 2023

(54) METHOD AND INSTALLATION FOR MANUFACTURING A FLOOR COVERING PRODUCT AND FLOOR COVERING PRODUCT OBTAINED HEREBY

(71) Applicant: UNILIN, BV, Wielsbeke (BE)

(72) Inventor: Christophe Naeyaert, Jabbeke (BE)

(73) Assignee: UNILIN BV, Wielsbeke (BE)

( * ) Notice: Subject to any disclaimer, the term of this patent is extended or adjusted under 35 U.S.C. 154(b) by 106 days.

(21) Appl. No.: 16/362,029

(22) Filed: Mar. 22, 2019

(65) Prior Publication Data

US 2019/0217593 A1 Jul. 18, 2019

Related U.S. Application Data

(63) Continuation of application No. 15/329,510, filed as application No. PCT/IB2015/055826 on Jul. 31, 2015, now Pat. No. 10,940,680.

(Continued)

(51) Int. Cl.
*B32B 37/20* (2006.01)
*B29C 48/00* (2019.01)
(Continued)

(52) U.S. Cl.
CPC ............ *B32B 37/203* (2013.01); *B29C 43/22* (2013.01); *B29C 43/48* (2013.01); *B29C 48/0021* (2019.02); *B30B 5/06* (2013.01); *B32B 5/02* (2013.01); *B32B 5/022* (2013.01); *B32B 5/028* (2013.01); *B32B 27/08* (2013.01); *B32B 27/12* (2013.01); *B32B 27/18* (2013.01); *B32B 27/20* (2013.01); *B32B 27/22* (2013.01); *B32B 27/304* (2013.01); *B32B 27/32* (2013.01); *B32B 27/40* (2013.01); *B32B 37/10* (2013.01); *B32B 37/1027* (2013.01); *B32B 38/06* (2013.01); *B32B 38/145* (2013.01); *B44C 1/24* (2013.01);
(Continued)

(58) Field of Classification Search
CPC ..... B32B 37/203; B44B 5/0047; B29C 59/04; B29C 59/022
USPC .......................................................... 156/242
See application file for complete search history.

(56) References Cited

U.S. PATENT DOCUMENTS 4,116,594 A * 9/1978 Leanna .................... B41C 1/18
425/3
5,141,583 A 8/1992 Held
(Continued)

FOREIGN PATENT DOCUMENTS

BE 1021929 B1 1/2016
CN 1077504 A 10/1993
(Continued)

OTHER PUBLICATIONS

English Translation of Haust (EP2719547) (Year: 2014).*
(Continued)

*Primary Examiner* — Matthew J Daniels
*Assistant Examiner* — Hana C Page
(74) *Attorney, Agent, or Firm* — Workman Nydegger (57) ABSTRACT

A method for manufacturing a floor covering product includes the steps of forming a single- or multilayered substrate by extruding of synthetic material-based material in a layer shape; laminating at least one continuous film to the substrate; and impressing the at least one continuous film using a roller provided with a relief on its surface.

14 Claims, 2 Drawing Sheets

Related U.S. Application Data (60) Provisional application No. 62/031,554, filed on Jul. 31, 2014.

(51) Int. Cl.

| | | |
|---|---|---|
| B32B 27/30 | (2006.01) | |
| B32B 27/32 | (2006.01) | |
| B32B 38/06 | (2006.01) | |
| B32B 38/00 | (2006.01) | |
| B32B 37/10 | (2006.01) | |
| B29C 43/22 | (2006.01) | |
| B29C 43/48 | (2006.01) | |
| B32B 5/02 | (2006.01) | |
| B32B 27/12 | (2006.01) | |
| B32B 27/18 | (2006.01) | |
| B32B 27/20 | (2006.01) | |
| B32B 27/22 | (2006.01) | |
| B32B 27/40 | (2006.01) | |
| B30B 5/06 | (2006.01) | |
| B32B 27/08 | (2006.01) | |
| B44C 1/24 | (2006.01) | |
| B44C 5/04 | (2006.01) | |
| E04F 15/10 | (2006.01) | |
| E04F 15/02 | (2006.01) | |
| B32B 37/00 | (2006.01) | |
| B32B 37/02 | (2006.01) | |
| B32B 37/04 | (2006.01) | |
| B32B 37/08 | (2006.01) | |
| B32B 37/24 | (2006.01) | |
| B29C 35/08 | (2006.01) | |
| B29C 59/04 | (2006.01) | |
| B29L 31/00 | (2006.01) | |

(52) U.S. Cl.
CPC .......... *B44C 5/04* (2013.01); *E04F 15/02038* (2013.01); *E04F 15/102* (2013.01); *E04F 15/105* (2013.01); *E04F 15/107* (2013.01); *B29C 59/046* (2013.01); *B29C 2035/0822* (2013.01); *B29C 2043/483* (2013.01); *B29L 2031/732* (2013.01); *B32B 37/0053* (2013.01); *B32B 37/02* (2013.01); *B32B 37/04* (2013.01); *B32B 37/08* (2013.01); *B32B 37/20* (2013.01); *B32B 37/24* (2013.01); *B32B 2262/101* (2013.01); *B32B 2264/067* (2013.01); *B32B 2305/08* (2013.01); *B32B 2305/22* (2013.01); *B32B 2305/30* (2013.01); *B32B 2307/412* (2013.01); *B32B 2307/414* (2013.01); *B32B 2307/514* (2013.01); *B32B 2307/554* (2013.01); *B32B 2307/734* (2013.01); *B32B 2307/75* (2013.01); *B32B 2309/105* (2013.01); *B32B 2315/08* (2013.01); *B32B 2315/085* (2013.01); *B32B 2317/16* (2013.01); *B32B 2327/06* (2013.01); *B32B 2419/04* (2013.01); *B32B 2471/00* (2013.01)

(56) References Cited

U.S. PATENT DOCUMENTS

| | | | |
|---|---|---|---|
| 5,506,031 A * | 4/1996 | Spain | B29C 59/04 428/167 |
| 5,937,759 A | 8/1999 | Mitsam et al. | |
| 7,326,314 B2 * | 2/2008 | Fuller | A61F 13/15699 156/244.18 |
| 2002/0100249 A1 | 8/2002 | Peng et al. | |
| 2002/0142135 A1 | 10/2002 | Chen et al. | |
| 2002/0192548 A1 | 12/2002 | Schaefer et al. | |
| 2005/0166513 A1 | 8/2005 | Vanderhoef | |
| 2009/0205777 A1 | 8/2009 | Mclaughlin | |
| 2010/0055420 A1 | 3/2010 | Vermeulen | |
| 2010/0092731 A1 | 4/2010 | Pervan et al. | |
| 2010/0297401 A1 | 11/2010 | Rasmussen | |
| 2010/0300609 A1 | 12/2010 | Caldas et al. | |
| 2011/0120634 A1 * | 5/2011 | Thiers | E04F 15/02 156/230 |
| 2012/0077890 A1 | 3/2012 | Mancosh et al. | |
| 2013/0147090 A1 | 6/2013 | Schromm et al. | |
| 2013/0183506 A1 | 7/2013 | Vermeulen | |
| 2013/0228946 A1 * | 9/2013 | Comerio | B29C 59/002 264/40.7 |
| 2013/0280531 A1 | 10/2013 | Thornton et al. | |
| 2014/0147641 A1 * | 5/2014 | Vermeulen | B32B 27/304 428/201 |
| 2015/0165748 A1 * | 6/2015 | Anspach | B32B 27/20 156/209 |
| 2015/0224670 A1 | 8/2015 | Sheffield et al. | |
| 2015/0343739 A1 | 12/2015 | Pervan | |
| 2016/0016391 A1 * | 1/2016 | Lundblad | B32B 27/22 428/195.1 |
| 2016/0311138 A1 | 10/2016 | Schromm et al. | |

FOREIGN PATENT DOCUMENTS

| | | |
|---|---|---|
| CN | 103052482 A | 4/2013 |
| CN | 103153608 A | 6/2013 |
| DE | 102011012735 A1 | 8/2012 |
| EP | 0363794 A2 | 4/1990 |
| EP | 1026341 A2 | 8/2000 |
| EP | 2435249 A1 | 4/2012 |
| GB | 2338435 A | 12/1999 |
| RU | 2095251 C1 | 11/1997 |
| RU | 2233358 C2 | 7/2004 |
| WO | 9622413 A1 | 7/1996 |
| WO | 9701442 A1 | 1/1997 |
| WO | 9747834 A1 | 12/1997 |
| WO | 2011007331 A2 | 1/2011 |
| WO | 2012001091 A1 | 1/2012 |
| WO | 2012001109 A1 | 1/2012 |
| WO | 2013179260 A1 | 12/2013 |
| WO | 2013179261 A1 | 12/2013 |
| WO | 2014115086 A2 | 7/2014 |

OTHER PUBLICATIONS

"Paratus Industries," Available Aug. 20, 2009. <http://www.paratusindustries.com/roll_building.htm> (Year: 2009).*

English Translation of Shimizu (JP2000233422) (Year: 2000).*

"High Capacity, Continuous Production Via a Multi-Stage Double Belt Press," JEC Group, retrieved from http://www.eccomposites.com/knowledge/international-composites-news/high-capacity-continuous-production-multi-stage-double-belt, Feb. 11, 2011.

International Search Report for corresponding International PCT Application No. PCT/IB2015/055826, dated Nov. 17, 2015.

* cited by examiner

METHOD AND INSTALLATION FOR MANUFACTURING A FLOOR COVERING PRODUCT AND FLOOR COVERING PRODUCT OBTAINED HEREBY

This application is a continuation application of U.S. patent application Ser. No. 15/329,510 filed on Jan. 26, 2017, which claims the benefit under 35 U.S.C. 119(e) to the U.S. provisional application No. 62/031,554 filed on Jul. 31, 2014, each of which is incorporated herein by reference.

BACKGROUND OF THE INVENTION

Field of the Invention

This invention relates to a method and installation for manufacturing a floor covering product and to a floor covering product obtained thereby.

More particularly, the invention relates to the manufacture of floor covering products with a synthetic material-based substrate upon which at least one film is laminated.

The film laminated thereon may be of any kind. In the first place, however, a printed film is meant, more particularly a decor film. However, this may also relate to another film, such as a film functioning as a wear layer. Also, a plurality of films may be laminated thereon, for example, the decor film with thereabove a film functioning as a wear layer.

In particular, however, not restrictive, the invention aims at the manufacture of floor covering products, the substrate of which is formed of thermoplastic synthetic material.

SUMMARY OF THE DISCLOSURE

More particularly, the invention relates to the production of synthetic material-based floor panels which can be provided as a floor covering on a supporting underlying floor. Generally, such floor panels are known as vinyl tiles, also called LVT (Luxurious Vinyl Tiles), as up to now they mostly are realized on the basis of vinyl. Although the invention in the first place also aims to vinyl tiles, it is clear that it does not restrict itself to this synthetic material, however, is also applicable to tiles, more particularly floor panels of which at least the substrate is realized on the basis of other synthetic materials, for example, polypropylene (PP), polyethylene (PET) or polyurethane (PUR). Preferably, this relates to semi-rigid or soft synthetic materials, which to this aim may be provided, for example, with plasticizers.

Said film, films, respectively, laminated on the substrate, may consist of any suitable synthetic material, however, preferably a PVC film is applied. Other examples are PU, PP and PET films. In the case of a PP film, this may relate, for example, to an oriented polypropylene film. In the case of a PVC film, this preferably relates to a hard PVC film, namely, a film on the basis of PVC without plasticizer or with an amount of plasticizer of less than 5 percent by weight. Such hard PVC film can be printed with a higher precision, certainly in the case of a print performed with water-based inks. In such case, a drying operation by means of heat supply is desirable in the printing process, however, by choosing hard PVC the possible expansion of the film is restricted. The wear layer preferably also comprises a thermoplastic material, such as soft or hard PVC, PU, PP or PET. Preferably, the transparent thermoplastic wear layer is free from solid additives, such as ceramic particles for promoting wear resistance, although this kind of particles is not excluded. However, the inventor has found that they may be omitted in view of obtaining a good transparency, whereas still an acceptable wear resistance is kept.

According to an alternative, it is not excluded that the printed decor or the print may be provided on the underside of the wear layer, wherein then no separate film will be necessary for applying the decor. If indeed specifically a film is applied for the decor, the print can be provided either on the upper side only, or on the lower side only, or both on the upper side and the lower side.

Such tiles actually relate to floor panels which either may be square, or rectangularly oblong, or may have any other shape.

Herein, the possibly provided decor may form a representation of a wood motif or stone motif, or any other motif, such as a fancy pattern.

On the surface of such products, for example, said vinyl tiles, a structure may be provided, formed by impressions, such as a wood or stone structure, respectively. Other impressions may be applied as well, for example, in order to imitate deeper-located joints or the like. Further, it is also known that such structure can be performed in correspondence with the printed motif, which in English is called "registered embossed". By such "correspondence", as is known, has to be understood that the structure is performed according to a motif which is adapted to the printed motif and that consequently the impressions cannot be provided randomly in respect to the printed motif.

The invention aims at a method with which such and other floor covering products can be realized in a particularly smooth manner, such by successively linking very specific production steps, wherein at the same time a good, thus, high-quality lamination of a film on a substrate in such production process is striven for.

To this aim, the invention, according to a first aspect, relates to a method for manufacturing a floor covering product, wherein this method comprises at least a first step of forming a single- or multi-layered substrate by consolidating synthetic material-based starting material, as well as comprises a second step after the first step, which preferably is performed in line with the first step, wherein at least one continuous film is laminated onto the substrate, characterized in that said laminating is performed by means of a belt press. By performing the lamination after the consolidation of the substrate, and also by realizing this lamination by means of a belt press, a high-quality end product can be obtained with great certainty. As, during laminating, it is started from an already substantially consolidated product, optimum starting conditions for laminating are created. As, during laminating, a belt press is used, wherein thus a contact is maintained over a longer distance, possible inaccuracies will be flattened further and/or a good lamination can be guaranteed, with a minimum of deformations.

Preferably, the one or more films in transport direction are clamped between a belt of the belt press and the substrate at least over a length of at least 0.5 m and still better at least 1 meter.

It is noted that continuous lamination processes have already been known previously, however, not with the use of a belt press.

Further characteristics of the invention are described in the appended claims.

According to the most preferred embodiment, the forming of the substrate is performed by means of a strewing process, wherein the synthetic material-based starting material is strewn as a granulate or in any other manner and subsequently is consolidated in a press device. It has become apparent that a strewing process offers a good starting basis in order to subsequently apply thereto a lamination according to the invention. So, for example, a very smooth surface is obtained after compressing the strewn material, by which a good underlying surface is obtained for laminating the continuous film.

Preferably, the strewn granulate or the like is consolidated by means of a continuous press, more particularly a belt press, and in particular a double-belt press. The use of a belt press also promotes the smoothness of the product obtained therefrom.

However, the aforegoing does not exclude that according to an alternative the substrate can be formed by means of extrusion, preferably an extrusion in which the synthetic material-based material, more particularly starting material, is extruded in a layer shape, or by means of a comparable process, wherein possibly a plurality of layers are thermally laminated on top of each other.

Preferably, the step of forming the substrate shows one or more of the following characteristics:
  that in the starting material one or more other materials than synthetic material are incorporated, such as additives and/or fillers, amongst which chalk;
  that reinforcement material, more particularly fibers, are incorporated into the substrate, preferably in the form of one or more local layers in the form of a fiber mat, non-woven or fabric, for example, in the form of glass fiber, such as a glass fiber fleece, cloth or net.

Preferably, said laminating of the continuous film in the second step is performed by means of a double-belt press.

In particular, it is preferred that said laminating of the continuous film in said second step is performed by means of a belt press which is made as an isobaric press. This offers a considerable advantage. Hereby in fact a very uniform lamination can be effected.

More particularly, it is preferred that said laminating of the continuous film in said second step in the belt press is performed by means of a fluid pressure which is exerted on a surface of a belt of the belt press, more particularly in a zone along which this belt is moving.

Preferably, in said second step a double-belt press is applied, wherein the substrate and the continuous film are moved along between the two belts of the double-belt press, wherein the fluid pressure is exerted on the belt which is situated on the side of the continuous film, whereas the other belt functions as a counter support.

According to an alternative possibility, for said laminating in said second step, instead of the aforementioned belt press use is made of another press, which press, however, is an isobaric press, more particularly is a press which presses the film directly or indirectly with a uniform fluid pressure over a surface of the substrate onto this latter. It is clear that any form of isobaric pressing process leads to an advantageous result.

Preferably, for creating the pressure in the press use is made of a gaseous fluid, more particularly air, or according to an alternative of a liquid, for example, oil.

From a practical point of view, it is preferred that said laminating of the film on the substrate is performed by fusion.

Thus, it is preferred that in order to provide for a fusion, the substrate and/or the film to be provided thereon by lamination are brought to a suitable temperature, before, during or after joining the substrate and the film. The value of the temperature to be applied is the value at which a fusion takes place and as such is known and/or can be determined by a person skilled in the art in a simple manner.

The aforementioned temperature can be effected, for example, by means of or at least in part by one or more of the following possibilities:
  by applying heat, which is present in the substrate, originating from said first step;
  by adding heat to the substrate and/or to the continuous film between the first and second steps or during the second step.

According to a preferred embodiment, during the second step heat is supplied via a heated roller placed at the starting point of the belt press, preferably a deflection roller of a belt of the press which comes into contact with the continuous film.

Towards the end of the lamination, preferably a cooling is provided in order to consolidate the assembly of substrate and film. To this aim, for said laminating use may be made of a fluid pressure which is directly or indirectly exerted on a surface of a belt of the belt press, wherein the cooling is performed via this fluid.

It is noted that said continuous film preferably is a decor film and more particularly a film which is provided with a print. Such print can be realized beforehand at a printer's, however, according to a preferred alternative of the invention, the film forming the decor layer is printed directly, thus, during the manufacturing process, however, prior to laminating, preferably by means of a digital printer or printing unit. It is also not excluded to realize the print after laminating, or partially before and partially after, however, preferably before possible impressions for forming a relief are provided in the surface.

In a preferred embodiment, impressions are provided in the upper side of the floor covering product, too, more particularly in the same continuous process, preferably after laminating the continuous film onto the substrate.

Preferably, the floor covering product comprises a printed decor and the impressions are realized as so-called "in register" with the decor.

In a particular embodiment, the impressions are provided by means of a, whether or not multi-part, roller, which is provided with a relief on its surface.

More particularly, it is preferred that a roller is applied with, seen along the circumference, at least two segments which each are provided with a relief, wherein in circumferential direction the distance between at least two of these segments is adjustable in order to change the so-called "repeat" with which the impressions are realized, wherein this "repeat" is adjusted and changed in function of the position of the decor.

Preferably, the method herein is also characterized in that the substrate and said continuous film, whether or not together with still other layers, form a material web and that this material web is bent around the aforementioned roller, such that the cooperation between the relief and the material web at least takes place over an arc-shaped portion. More particularly, it is preferred that the material of the material web is kept in contact with the roller during at least 3 seconds, and still better at least 5 seconds. It is also preferred that the material web is supplied to the roller in heated condition and that the roller is cooled.

Other techniques for providing impressions "in register" of course can also be applied, or different techniques can be combined, too.

According to a possibility of the invention, it is characterized in that said continuous film is a decor layer and that this film is subjected to a controlled stretching prior to laminating, in order to stretch the decor to a larger or lesser extent, in the width and/or length, such that the decor is adjusted in function of the desired final result.

The floor covering product can be provided with a translucent wear layer, for example, in the form of at least one film and/or in the form of at least one lacquer layer.

In a preferred application, the method is characterized in that the substrate and said continuous film, whether or not together with still other layers, form a material web and that this material web is cut to floor panels, more particularly to rectangular oblong or square panels or tiles.

According to a particular embodiment, the floor panels are formed such that they are free from coupling parts at their edges, wherein the floor panels are of the type which is intended for being installed according to the "loose lay" principle, or for being installed by means of gluing to the underlying surface.

According to another possibility, the method is characterized in that the floor panels are provided with coupling parts at their edges, whereby a plurality of such panels can be coupled to each other at their edges in a mechanical manner in order to thereby provide for a locking preferably horizontally as well as vertically.

The method of the invention preferably is applied for the production of so-called LVT tiles (Luxurious Vinyl Tiles) or comparable floor panels.

According to a variant of the invention, instead of using said continuous film, use is made of successive film sheets which are laminated on the continuously formed substrate.

Preferably, the substrate shows one or more of the following characteristics:
  the material of the substrate contains a thermoplastic;
  the material of the substrate contains a supple thermoplastic, more particularly a thermoplastic which is provided with a plasticizer;
  the material of the substrate is based on any of the following materials: polyvinyl chloride (PVC), polypropylene (PP), polyethylene (PET) or polyurethane (PUR);
  the material of the substrate contains one or more filler materials, for example, chalk;
  the material of the substrate, either across the entire thickness thereof, or across only a portion of the thickness thereof, substantially consists of a composite of synthetic material and wood particles, and more particularly WPC (Wood Plastic Composite), wherein for the synthetic material preferably use is made of any of the herein above-mentioned synthetic materials;
  the substrate consists of at least two layers, namely, a layer such as described in the preceding paragraph, and a layer which is free or substantially free from wood particles and substantially is based on synthetic material;
  the substrate contains a reinforcement layer, such as a glass fiber fleece or the like.

Preferably, the continuous film shows one or more of the following characteristics:
  it relates to a thermoplastic synthetic material film;
  it relates to a PVC film, PU film, PP film, or PET film;
  it relates to an oriented polypropylene film;
  it relates to a hard PVC film, namely, a film on the basis of PVC without plasticizer or with an amount of plasticizer of less than 5 percent by weight.

According to a particularly preferred aspect, the method is characterized in that the substrate, starting from its manufacture up to the forming of the final floor covering product, is handled in a flat state, or, during bending, is subjected exclusively to bending having a radius of more than 40 cm. In this manner, relatively thick material webs can be formed in a smooth manner.

According to the invention, it is not excluded that simultaneously, by which is intended in the same production process, or possibly precisely at the same time, two or more films, more particularly synthetic material films, are provided by means of said lamination.

By further combining very specific techniques with each other in preferred embodiments, as discussed herein above, a method is obtained which in many respects can be universally applied, wherein also a larger possibility is offered for realizing various products, starting from one and the same belt press, with minor adjustments, for example, with different features and/or of a different construction.

In a preferred embodiment, according to the invention floor covering products of a very small thickness as well as of a larger thickness, and thus more difficult to bend, can be realized. Practical values of thicknesses are 2 to 6 mm.

Although the invention in the first place relates to floor panels, it can also be applied for the production of wall-to-wall floor covering products, such as vinyl, which is marketed on rolls.

It is noted that of course it is not excluded to provide a backing layer or underlying layer on the underside of the substrate, such as a vapor-tight layer, for example, a thermoplastic film.

A lacquer layer can be provided as the uppermost layer of the floor covering product. Herein, this may relate, for example, to an UV- or an electron beam-hardening lacquer layer and/or to a PU lacquer layer. Such lacquer layer may replace said film functioning as a wear layer, however, may also be applied hereon as an additional layer.

Preferably, the invention, as already stated herein above, is applied for manufacturing floor panels, which are provided with mechanical coupling means, more particularly coupling parts, on the respective edges, which allow that two of such floor panels can be coupled to each other in such a manner that a locking is obtained in a vertical direction perpendicular to the plane of the coupled panels, as well as in a horizontal direction perpendicular to the coupled edge and in the plane of the panels. Preferably, the coupling means also show one or a combination of two or more of the following features:
  the feature that the mechanical coupling means or coupling parts substantially are made as a tongue and a groove bordered by an upper lip and a lower lip, wherein this tongue and groove substantially are responsible for the locking in said vertical direction, and wherein the tongue and the groove are provided with additional locking parts substantially responsible for the locking in said horizontal direction. Preferably, the locking parts comprise a protrusion on the lower side of the tongue and a recess in the lowermost groove lip. Such coupling means and locking parts are known, for example, from WO 97/47834;
  the feature that the mechanical coupling means or coupling parts press the coupled floor panels against each other, for example, in that these mechanical coupling means are realized with so-called pre-tension, as is known as such from EP 1 026 341. The tensioning force with which the floor panels are pressed against each other or towards each other may be obtained, for example, in combination with the above feature, by means of a lower lip, which is bent out in coupled position and which, trying to spring back, presses against the lower side of the tongue;

the feature that the mechanical coupling means allow a coupling by means of a horizontal, or quasi-horizontal, shifting movement of the panels towards each other;

the feature that the mechanical coupling means allow a coupling by means of a turning movement along the respective edges;

the feature that the mechanical coupling means allow a coupling by means of a downward-directed movement of a male coupling part having, for example, a tongue, up into a female coupling part having, for example, a groove, preferably in order to install such panels according to the so-called "fold-down" principle;

the feature that the mechanical coupling means, or at least the pertaining upper edge, is realized by means of a milling treatment with rotating milling tools.

Preferably, said coupling means are realized substantially in said substrate, more particularly at least in at least one of said two layers which, according to the invention, enclose the glass fiber layer. Preferably, said coupling means are provided by means of a milling treatment with rotating milling tools. Preferably, the floor panel of the invention relates to a rectangular, either oblong or square, panel which is provided with mechanical coupling means on both pairs of opposite edges.

Panels which are provided with coupling means preferably have a thickness of at least 2.5, still better at least 3 millimeters.

It is not excluded that, also as stated herein above, the invention is applied for panels which are free from coupling means or coupling parts at their edges, wherein these panels then are intended for being glued with their underside to the underlying surface or for being installed loosely. Such panels preferably have a thickness of less than 6, and still better less than 4 millimeters, however, preferably of more than 1.5 millimeters.

Prior to laminating said film onto the substrate, possibly a levelling treatment may be performed on the surface of the substrate. The levelling treatment may consist, for example, of a grinding treatment and/or providing one or more layers of plastisol. Preferably, this levelling treatment is performed in line with the steps of the substrate.

The present invention also relates to an installation for manufacturing a floor covering product, more particularly for realizing the aforementioned method, characterized in that it consists at least of a device for forming a single- or multi-layered substrate by consolidation of synthetic material-based starting material, as well as a device connected thereto for laminating at least one preferably continuous film on the substrate, wherein this latter device makes use of a belt press.

In a preferred embodiment, the installation is provided with a press with features as described herein above.

The installation possibly may comprise a device for forming impressions in order to provide the floor covering product with a relief on its surface, wherein for this device preferably use is made of a roller as described herein above.

The installation also may comprise a printing device, preferably a digital printer, with which a decor is printed on the continuous film, preferably while this film is supplied to the device for laminating.

Further, the installation may also comprise one or more additional devices and/or comprise additional provisions for effecting one or more operations of the herein above-described method.

According to a second aspect, the invention also relates to a method for manufacturing a floor covering product, wherein this method comprises at least a first step for forming a single- or multi-layered substrate by consolidating synthetic material-based starting material, as well as comprises a second step after the first step, which preferably is performed in line with the first step, wherein at least one continuous film is laminated on the substrate, and also comprises a third step, wherein impressions are formed in the surface, with the characteristic:

that the forming of the substrate is performed by means of a strewing process, wherein the synthetic material-based starting material is strewn as a granulate and subsequently is consolidated in a press device; and that the impressions are provided by means of a roller, which is provided with a relief on its surface, wherein for this roller a roller is applied with, seen along the circumference, at least two segments, which each are provided with a relief, wherein in circumferential direction the distance between at least two of these segments is adjustable in order to change the so-called "repeat" with which the impressions are realized, wherein this "repeat" is adjusted and altered in function of the position of an applied decor.

According to this second aspect, the laminating step is of less importance and may take place in any manner. The combination of forming a substrate by means of a strewing process and the use of an adjustable roller for providing impressions in register already leads to a particularly smooth production process. All other characteristics which are described by means of the first aspect and the claims thereof, of course may also be applied in combination with the second aspect.

All partial features from the first aspect can be employed at choice in the method of the second aspect.

In the first as well as in the second aspect, of course the films to be laminated are thin films and preferably have a thickness of less than 1 mm, and still better less than 0.5 mm and even better less than 0.2 mm.

It is clear that the invention also relates to floor covering products such as obtained by the aforementioned methods and/or by the application of the aforementioned installation.

BRIEF DESCRIPTION OF THE DRAWINGS

With the intention of better showing the characteristics of the invention, herein below, as an example without any limitative character, some preferred embodiments are described, with reference to the accompanying drawings, wherein.

DETAILED DESCRIPTION OF PREFERRED EMBODIMENTS OF THE INVENTION

Figure 1:
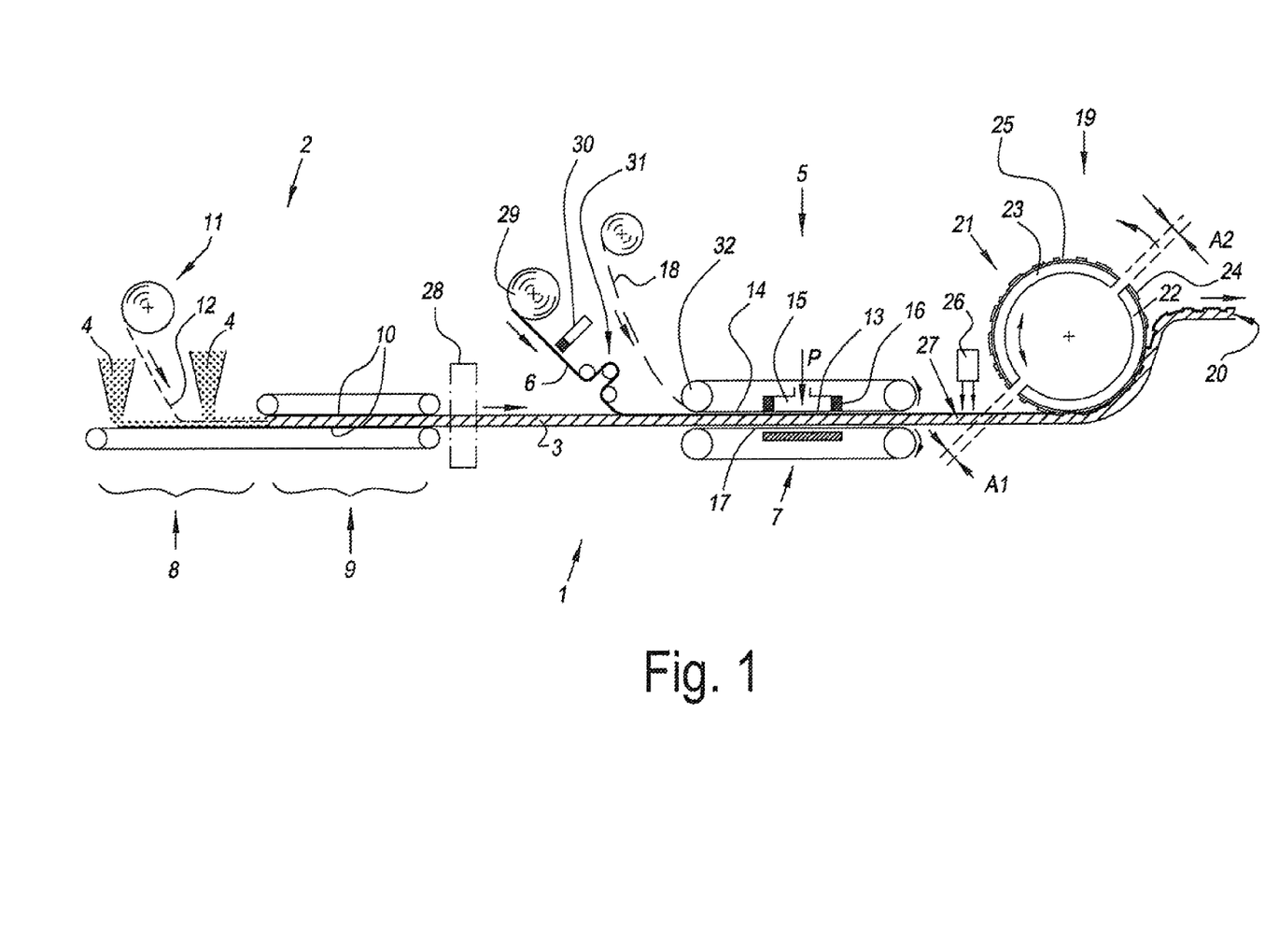
FIG. 1 schematically illustrates a possible embodiment of the method of the invention, as well as schematically represents the installation applied therewith.

In the accompanying FIG. 1, an installation 1 according to the invention is represented, which consists at least of a device 2 for forming a substrate 3 by consolidation of synthetic material-based starting material 4, as well as a subsequent device 5 for laminating at least one preferably continuous film 6 on the substrate 3, wherein this last-mentioned device 5, for the lamination makes use of a belt press 7, such that the film 6 is pressed, at least over a well-defined distance, in contact with the substrate 3.

The device 2 preferably is of the type wherein the substrate is formed by means of a strewing process, wherein the synthetic material-based starting material 4 is strewn as a granulate in a strewing portion 8 of the device 2 and subsequently is consolidated in a press device or press portion 9. As represented schematically, this press portion 9 preferably consists of a double-belt press 10.

The strewing portion 8 may be of a different construction and possibly may also comprise supply means 11 for incorporating a reinforcement layer, such as a glass fiber fleece 12, into the substrate.

As aforementioned and according to the first aspect of the invention, the device 5 comprises a belt press 7. In particular, it is preferred that this belt press 7 is made as an isobaric press, wherein laminating the continuous film 6 in the belt press is performed by means of a fluid pressure P, which is exerted on a surface 13 of a belt 14 of the belt press 7. As represented schematically, to this aim a chamber 15 may be formed along this belt, which chamber is bordered by a frame or border 16, wherein in the thus formed chamber 15 a pressure can be built up, which pressure acts on the respective portion of the belt 14.

In this manner, a uniform pressure is realized during laminating, by which a smooth lamination is created.

It is clear that the belt press 7 preferably is a double-belt press having a second belt 17 which provides for the necessary support.

The use of an isobaric press shows the advantage that on the location where the actual lamination is performed, a very uniform compression takes place, by which stresses in the plane of the substrate and the film practically are excluded, which leads to a uniform lamination It is represented schematically that also still another film 18 can be laminated along. In a practical embodiment, the film 6 will be intended for forming a decor layer, whereas the film 18 forms a wear layer. It is noted that it is not excluded to laminate, according a not-represented embodiment, the films 6 and 18 each by means of an own belt press 7, wherein then two belt presses 7 have to be installed one after the other.

It is noted that according to a not-represented variant, it is not excluded to apply an isobaric press, wherein the fluid presses directly on the respective film or films, without the intermediary of a belt or any other element.

Further, the method applied therewith may comprise also other steps, wherein the necessary devices and/or additional provisions to this aim then are integrated into the installation.

So, for example, according to an important preferred embodiment, the installation is provided with a device 19 for forming impressions in the floor covering product 20 to be formed. As represented in the accompanying figure, to this aim preferably use is made of a roller 21 with along the circumference at least two segments 22-23, which each are provided with a relief 24-25, whether or not the same relief, wherein in circumferential direction the distance A1-A2 between at least two of these segments is adjustable in order to change the so-called "repeat" with which the impressions are realized, wherein this change preferably is performed in function of the position of the decor, this automatically, and with the intention of producing so-called "registered embossed" products.

At the entry of the device 19, a heating device 26, for example, by means of infrared radiation, can be provided for heating the upper side of the respective material layer or material web 27, preferably almost up to melting temperature, in order to obtain that the impressions can be realized. The roller 21 can be cooled in order to consolidate the then realized impressions in the obtained form by the cooling down and stiffening of the material layer 27, the longer this material layer is in contact with the roller over a longer time.

Further, it is also represented schematically in the figure that the installation 1 also can be provided with a device 28 for subjecting the substrate at least on one side to an additional levelling treatment, such as, for example, a grinding machine.

As aforementioned, the film 6 is intended for forming a decor layer. To this aim, this film 6 can be supplied as a printed film from a supply roll 29. According to an alternative, however, printing may also take place on site by means of a device 30, more particularly a printing device and in particular a digital printer or printing unit.

Also, it is not excluded to provide a further device 31 for subjecting the film 6 to a certain stretching, preferably in a controlled manner, for adjusting the length and/or width of the decor, for example, in function of an impression pattern to be provided afterwards.

In this manner, for example, by means of the device 31 an additional adjustment of the width of the decor can be provided for, whereas by means of the device 19 an adjustment of the length is provided by adapting the average so-called "repeat".

It is noted that it is not excluded to first have the belt press 7 be preceded by one or more pressing rollers, although this preferably shall not be the case.

At the entry of the belt press 7, preferably a heating is provided in order to obtain that the respective film 6 and/of 18 and/or the surface of the substrate is sufficiently heated in order to come to a consolidation by fusing. This heating may be performed by making use, at the entry of the belt press 7, of a heated roller, more particularly a deflection roller 32. However, in the chamber 15 preferably a cooled fluid is applied, for example, cooled air, in order to obtain in this manner a consolidation by stiffening after fusion.

According to an alternative, which may or may not be combined with the heating at the entry of the belt press 7, various temperatures can be maintained in the chamber 15, or the chamber may also be subdivided into segments in which different temperatures are prevailing. For example, on the run-in side a high temperature may be maintained in order to promote fusing, whereas on the exit side cold air can be provided.

Finally, it is noted that in particular in respect to the effect of the strewing process, on the one hand, and in respect to the realization of impressions with an adjustable roller, on the other hand, all information of the following patent applications has to be understood as being incorporated in the present application by reference:

WO 2013/179261
BE 2014/0517
PCT/IB2014/058464

Figure 2:
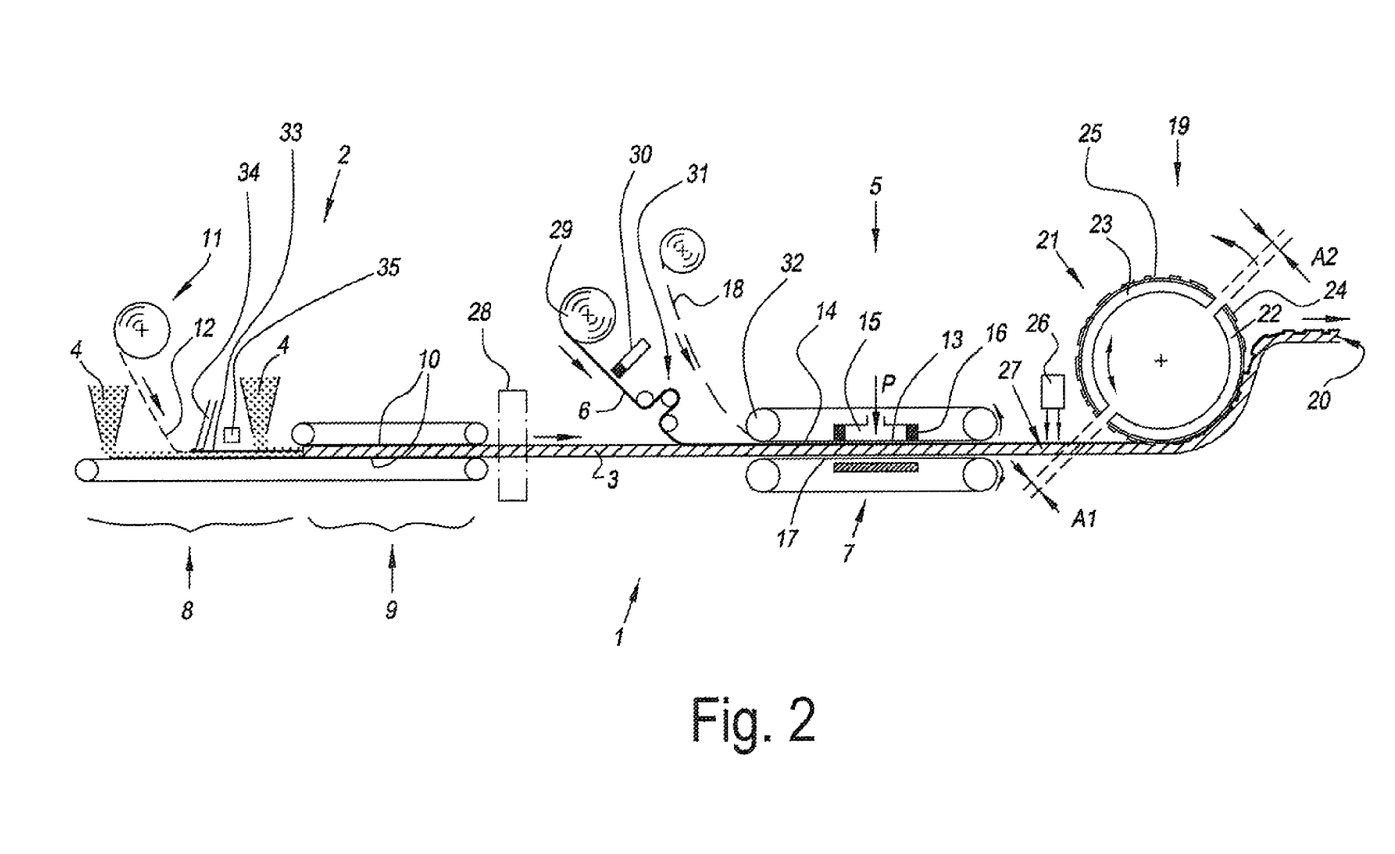
FIG. 2 represents a variant.

In FIG. 2, a variant is represented with the particularity that the reinforcement material, and in particular the reinforcement layer, such as the glass fiber fleece 12, is brought into contact with a plastisol, this in order to obtain a finally better consolidation and adherence among the various layers and to minimize the risk of a later delamination. In the example of FIG. 2, the plastisol is provided on the reinforcement layer, such as the glass fiber fleece 12, by means of a schematically represented device 34, whereby this penetrates in and through the glass fiber fleece and reaches the relatively rough surface of the lowermost strewn layer. In FIG. 2 is also shown that a second layer of starting material 4 is strewn here over. By providing for that the plastisol is gelled, a consolidated whole is obtained with a good mutual adherence. For gelling the plastisol 33, of course the necessary heat has to be supplied. In the represented example, this is realized by means of a heating device 35 installed between the device 34 and the second strewing device. It is noted that the heating may also take place at other locations, for example, downstream of the second strewing device, whether or not in the press portion 9. It is noted that the plastisol possibly may also be supplied to the reinforcement layer 12 before this latter is brought into contact with the strewn starting material.

According to a not represented embodiment, after the application of the reinforcement layer and the plastisol no additional starting material is strewn thereon, such that the plastisol forms the upper layer for the further process. In such case, it is even not excluded to add the reinforcement layer and the plastisol only after the press portion 9 and subsequently guiding or not guiding it through an own press portion.

It is noted that the herein above-mentioned possibilities for using a plastisol as such form independent aspects of the present invention, in particular where and how the plastisol is applied in combination with the strewing. These independent aspects thus may be applied whether or not in combination with the further downstream applied steps which were described herein above. Thus, combinations with other, subsequent production techniques are not excluded.

Finally, it is also noted that it is not excluded to work, instead of with a device 30 for printing the film 6 which is installed at a location before this film 6 is brought into contact with the substrate, with a device which provides a print after the film 6 is laminated onto the substrate, and preferably prior to providing possible prints.

According to a deviating independent aspect of the invention, one or more of the herein above-described production steps, which take place during said strewing, are combined with the application of a print directly on the formed material web, irrespective whether a film 6 is applied or not. As an example, this means that, for example, the film 6 is not provided and there is also no device 5, however, that at that location a printing device for providing a print is present.

It is also noted that, when a transparent lacquer layer is provided, this latter can be provided before or after providing the impressions on the final surface.

The present invention is in no way limited to the herein above-described embodiments, on the contrary may such method and installation be realized according to various variants without exceeding the scope of the present invention. Moreover, the panels, instead as floor panels, may also be made as wall panels or ceiling panels or even as furniture panels. Alternatively, the invention thus also relates to the same method as described herein above, however, then applied for the production of other panels than floor panels.

The invention claimed is:

1. A method for manufacturing a floor covering product, said method comprising the steps of:
   forming a single- or multilayered substrate by extruding of synthetic material-based material in a layer shape;
   laminating at least one continuous film to said substrate;
   impressing said at least one continuous film using a roller being provided with a relief on its surface;
   wherein the substrate and said at least one continuous film form a material web, and that this material web is bent around said roller as the at least one continuous film is impressed by the roller, the substrate being located radially away from the relief of the roller and the continuous film being radially closer to and facing the relief, such that the cooperation between the relief and the at least one continuous film takes place at least over an arc-shaped part;
   wherein at least the continuous film, when bent around said roller, is subjected to bending having a radius of 40 cm or more;
   wherein said at least one continuous film comprises a decor layer and that this film, prior to laminating, is subjected to controlled stretching in order to stretch the decor to a greater or lesser extent, in the width and/or length, such that the decor is adjusted in function of the desired final result.

2. The method according to claim 1, wherein the synthetic material is selected from following materials consisting the group of: polyvinyl chloride (PVC), polypropylene (PP), polyethylene (PET) and polyurethane (PUR).

3. The method according to claim 1, wherein the at least one continuous film comprises a printed film.

4. The method according to claim 3, wherein the impressions are in register with the décor.

5. The method according to claim 1, wherein the roller is applied with, seen along the circumference, at least two segments, which each are provided with a relief, wherein in circumferential direction the distance between at least two of these segments is adjustable in order to change the "repeat" with which the impressions are realized.

6. The method according to claim 1, wherein the material, which is moving along with the roller, of the material web is maintained in contact with the roller at least for 3 seconds.

7. The method according to claim 1, wherein the material web is supplied to the roller in a heated condition and that the roller is cooled.

8. The method according to claim 1, wherein the floor covering product is provided with a translucent wear layer.

9. The method according to claim 1, wherein the substrate is a multilayered substrate.

10. The method according to claim 1, wherein the continuous film has one or more of the following characteristics:
    a thermoplastic synthetic material film;
    a PVC film, PU film, PP film, or PET film;
    an oriented polypropylene film; and
    a hard PVC film on the basis of PVC without plasticizer or with an amount of plasticizer of less than 5 percent by weight.

11. The method according to claim 1, wherein the impressions are provided in the upper side of the floor covering product in the same continuous process after laminating the continuous film onto the substrate.

12. The method according to claim 1, wherein the lamination is applied by a belt press.

13. The method accordingly to claim 1, wherein the continuous film is directly adjacent the relief of the roller.

14. A method for manufacturing a floor covering product, said method comprising the steps of:
    forming a single- or multilayered substrate by extruding of synthetic material-based material in a layer shape;
    laminating at least one continuous film to said substrate;
    impressing said at least one continuous film using a roller being provided with a relief on its surface;
    wherein at least the continuous film is bent around said roller with the continuous film facing the relief, such that the cooperation between the relief and the continuous film takes place at least over an arc-shaped part;
    wherein the substrate and said continuous film form a material web, and that this material web is bent around said roller as the continuous film is impressed by the roller, the substrate being located radially away from the relief of the roller and the continuous film being radially closer to the relief;

wherein the material, which is moving along with the roller, of the material web is maintained in contact with the roller at least for 3 seconds; and wherein at least the continuous film, when bent around said roller, is subjected to bending having a radius of 40 cm or more.

\* \* \* \* \*